United States Patent Office 3,297,565
Patented Jan. 10, 1967

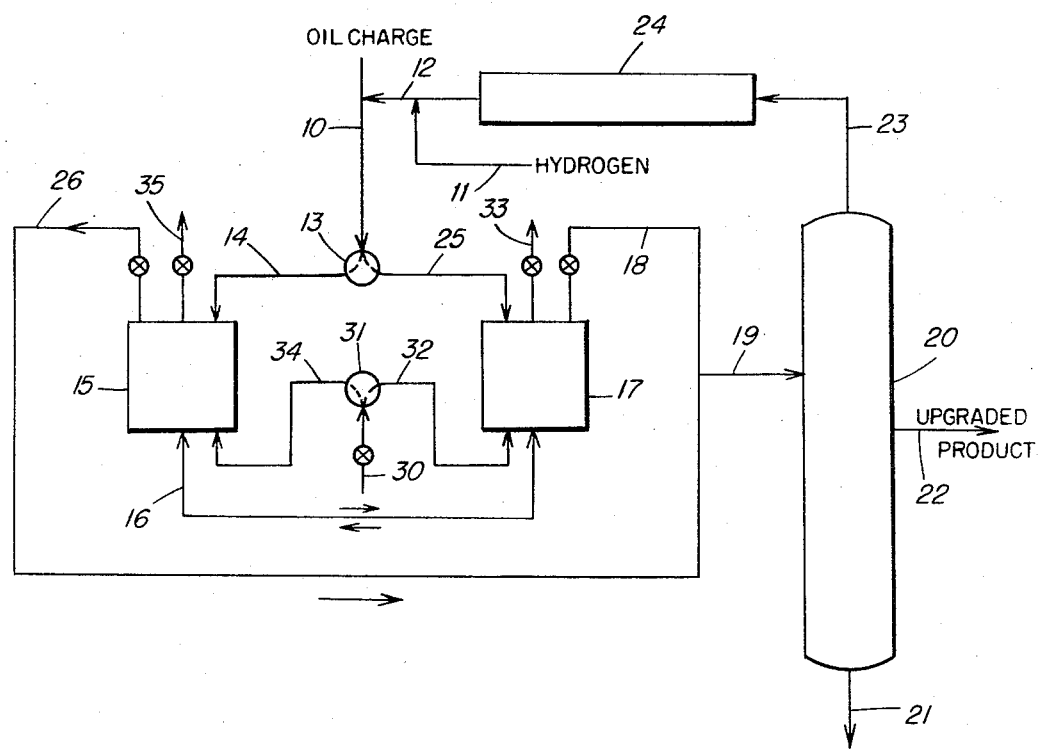

3,297,565
METHOD FOR UPGRADING HYDROCARBON OILS
William E. Garwood, Haddonfield, and Joseph N. Miale, Trenton, N.J., and Paul B. Weisz, Media, Pa., assignors to Mobil Oil Corporation, a corporation of New York
Filed Aug. 19, 1964, Ser. No. 390,550
23 Claims. (Cl. 208—217)

This invention relates to a method for converting and upgrading hydrocarbon oils. More particularly, the present invention is directed to a catalytic processing operation wherein a petroleum charge stock to be upgraded is brought into contact under specified conditions with a crystalline aluminosilicate of the type commonly known as a molecular sieve having a relatively non-volatile treating agent encased within its crystal structure. The present invention is directed to an improved cyclic conversion process wherein the hydrocarbon oil to be upgraded is contacted with a relatively non-volatile treating agent encased in an aluminosilicate of the type commonly referred to as a molecular sieve. The effluent mixture of the initial contact containing some of the treating agent in a relatively volatile form and the hydrocarbon oil product is passed through a second molecular sieve which contains no treating agent at the beginning of the operation but which adsorbs the volatile form of the treating agent portion of the effluent. The process can then be reversed utilizing the second molecular sieve containing the adsorbed volatile form of the treating agent, after regeneration when necessary, as the initial contact and the initial molecular sieve can be used as the collector to adsorb the resulting volatile treating agent effluent.

The term "upgrading of hydrocarbon oils" is meant in its broadest sense and includes hydroprocessing operations to improve the burning qualities of a fuel oil, and conversion processes which include dehalogenation, cracking to a lower carbon content and dehydrogenation reactions for forming hydrocarbons having a higher carbon to hydrogen ratio.

Among the dehydrogenation reactions which can be conducted utilizing the present invention are the conversion of paraffins to olefins and diolefins, of olefins to diolefins; dehydrocyclization reactions such as paraffins to aromatics; and other reactions in which organic compounds are converted to other compounds having a higher carbon-to-hydrogen ratio. These reactions proceed, generally, with astonishing efficiency at the preferred reaction conditions.

The difficulty associated with processes of this type heretofore mentioned is the recovery of the expensive treating agents used as catalytic agents which are rendered volatile during the reaction. According to the present invention a cyclic process is utilized wherein the treating agent is continuously recovered and reused.

It is the object of this invention to provide an improved cyclic process for upgrading hydrocarbon oils. A further objective is to provide a commercially attractive process capable of removing objectionable materials from hydrocarbon oils containing the same. A further objective is to provide a commercially attractive process capable of upgrading hydrocarbon oils and simultaneously providing a unique system to effect a high recovery of the treating agent utilized in the hydrocarbon conversion process.

The above and other objectives which will be apparent to those skilled in the art are achieved in accordance with the present invention. Broadly, the processes described herein involve in their initial phase treating a hydrocarbon oil at temperatures at the range of about 400–1400° F. in the presence of a molecular sieve material which has undergone prior treatment to encase within the crystal structure thereof an effective amount, and generally between about one and about sixty percent by weight, of a relatively nonvolatile treating agent. In the conversion of the hydrocarbon, an effluent is obtained which includes the hydrocarbon product and a volatile form of the treating agent which pass from the molecular sieve in the primary contact zone. This effluent is then passed into a secondary contact zone containing a molecular sieve which is initially free of the treating agent maintained at temperatures in the range from about 50° F. to about 300° F. where the effluent treating agent is then adsorbed and becomes encased in the molecular sieve of the secondary contact zone. These contacting conditions are maintained until the treating agent content in the molecular sieve materials of the primary and secondary contact zones respectively reach a predetermined minimum and maximum content; thereafter the regeneration of the secondary contact zone is accomplished and then the flow of the hydrocarbon charge is reversed and the conditions of temperature and pressure initially present in the primary zone and the secondary zone are reversed and the operation is repeated in a cyclic operation to afford a continuous yield of upgraded hydrocarbon oil product. The temperature of conversion will vary depending on the type of hydrocarbons utilized and will generally range from about 400 to about 1400° F., preferably in the range from about 700 to about 1100° F. at a liquid hourly space velocity within the approximate range of 0.1 to 10. The temperature selection is also affected by the choice of other reaction conditions including contact time, and pressure. The conversion process can be carried out at various pressures from sub-atmospheric to super-atmospheric pressures but, in general, pressures within the range from about atmospheric to about 5000 pounds per square inch can be utilized. In dehydrogenation reactions it is highly desirable to utilize an inert gas, i.e. inert to the conversion, such as nitrogen, carbon dioxide, benzene or naphthalene, or the like; to aid in carrying the hydrocarbon through the molecular sieve during its conversion. The use of the inert gas will aid in maintaining uniform flow rates and provide for more uniform reaction conditions.

It is contemplated that hydrocarbon oils which contain nitrogen, sulfur and/or oxygen compounds or heavy metals may generally be treated in accordance with the instant process. Thus, petroleum crudes, gas oils, naphthas, reduced crudes, residue, thermal and catalytic hydrocarbon stocks may be effectively treated. The present process is especially effective in selectively removing nitrogen from a hydrocarbon oil containing the same. Accordingly, high nitrogen stocks such as shale oil and tar sands are particularly applicable for treatment in accordance with the present process.

It is further contemplated that hydrocarbons which are reactive to the treating agent at the preferred reaction temperatures and are converted by contact therewith to hydrocarbon products having a higher carbon-to-hydrogen ratio, can be utilized in the process of this invention. The hydrocarbons which are suitable for use in this process are those which will pass through the uniform pore openings of the molecular sieves having the treating agent encased therein. It is essential, therefore, that the hydrocarbons which will be converted can pass through uniform pore openings ranging from about 4 to about 15 Angstrom units.

Molecular sieve materials utilized as contacting media in the instant process are composed of crystalline metal aluminosilicates, which have been heated to remove their water of hydration. The crystals obtained upon dehydration are unusually porous, the pores having highly uniform molecular dimensions, generally between about 4 and about 15 Angstrom units in diameter. Each crystal of molecular sieve material contains literally billions of tiny cavities or cages interconnected by channels of unvarying diameter. The size and portion of the metal ions in the crystal control the effective diameter of the interconnecting channels. As initially prepared, the metal of the aluminosilicate is an alkali metal and usually sodium. Such alkali metal is subject to base-exchange with a wide variety of other metal ions including by way of example, calcium, magnesium, silver, copper, mercury, cadmium, nickel, gold, cobalt, zinc, strontium, platinum, and the rare earths including cerium, lanthanum, neodymium, praseodymium and samarium separately or in combination. Sodium and calcium crystalline aluminosilicates of the molecular sieve type are available commercially and will ordinarily be employed for subsequent treatment with the treating agent for use in the present process. It is, however, within the purview of the invention to utilize a molecular sieve material wherein the metal ion is other than a sodium or calcium ion or wherein such cation has been replaced by a hydrogen ion. The molecular sieve material may also be of the A type, X type, Y type or other well known form of molecular sieve. Preparation of these molecular sieves is well known, having been described in the literature, for example in U.S. 2,882,243 and U.S. 2,882,244. Molecular sieves available commercially and suitable for use in the present process include the 13X and 10X types which are sodium and sodium-calcium crystalline aluminosilicates, capable of adsorbing molecules whose critical diameter is less than about 10 Angstrom units and the 4A and 5A types which are sodium and sodium-calcium crystalline aluminosilicates having channel diameters which will permit adsorption of molecules smaller than about 4 and 5 Angstrom units, respectively. The combined effect of the uniformly small channel size and the strong surface forces which distinguish molecular sieves from all other adsorbents essentially isolates the compounds caged within the crystal lattice. The compound will remain confined until released by heat or by displacement with another adsorbable material.

The relatively non-volatile treating agent which may be loaded into the crystalline molecular sieve material may be catalytically active material for accomplishing the desired result of upgrading the hydrocarbon oil which is non-gaseous at room temperatures and characterized by a vapor pressure which is less than about 1 mm. at the maximum temperature of the reaction in the primary reaction zone, namely about 1400° F. Some specific examples of the relatively non-volatile treating agent are gallium, boron, germanium, tin, antimony, iron and bismuth. Various methods may be employed for loading molecular sieve material with the treating agent. For example, the crystalline molecular sieve material may be loaded with the treating agent by bringing the sieve material in particle form into contact by milling and heating it with the metal. The conditions and duration of contact between the molecular sieve material and the metal is such as to encase within the crystal structure of the sieve material between about 1 and about 60 weight percent of the metal.

Table I shows examples of the treating agents and their boiling points and temperatures required to give 1 mm. vapor pressure.

TABLE I

| Treating Agent | B.P. ° C., | Temp., ° C., for 1 mm. Pressure |
|---|---|---|
| Gallium | 2,403 | ~1,500. |
| Boron (Amorphous) | 2,550 | est. >760 (1,400° F.). |
| Germanium | 2,700 | est. >760 (1,400° F.). |
| Tin | 2,260 | 1,503. |
| Antimony | 1,440 | 886 (1,627° F.). |
| Bismuth | 1,420 | 1,021. |
| Iron | 3,000 | 1,790. |

Thus, a hydrocarbon oil to be upgraded and generally high in sulfur, nitrogen, oxygen and/or heavy metal content is following the teachings of one embodiment of this invention, contacted in the presence of hydrogen with a crystalline aluminosilicate molecular sieve loaded with treating agent. A treating agent containing crystalline aluminosilicate molecular sieves having an effective pore diameter of between about 4 and about 15 Angstroms have been found to be particularly effective. The treating agent containing molecular sieve material may be brought into contact with the oil charge in any suitable manner. The temperature of treatment should be maintained within the approximate range of 400 to 1400° F. Below about 400° F., substantially no refining action takes place, while at temperatures in excess of about 1400° F., appreciable degradation of both the hydrocarbon stock and the molecular sieve takes place resulting in a lower liquid recovery and higher gas make with little additional refining. The pressure in the present hydro-processing operation may vary widely depending upon the particular oil stock undergoing treatment and the temperature used but, in general, will be within the range of about 50 to about 5000 p.s.i.g. The hydrogen charge rate is generally within the approximate range of 2 to 80 moles per mole of hydrocarbon. The liquid hourly space velocity employed is ordinarily between about 0.1 and about 10.

During passage of the petroleum stock along with hydrogen over the treating agent containing molecular sieve material, a portion of the treating agent reacts catalytically with the charge stock and is converted to a lower boiling compound thereof. The amount of treating agent required for refining of the oil charge depends largely on the extent of contamination. Such amount is generally between about 0.2 and about 15 percent by weight and more generally between about 1 and about 10 percent by weight of the oil undergoing treatment. The process of this invention can be carried out in any equipment suitable for catalytic operations. Accordingly, the instant hydro-processing process is adapted to operations using a fixed bed of the treating agent containing molecular sieve contacting material. Also, the process can be operated using a moving bed of particle form treating agent containing molecular sieve material wherein the flow of hydrocarbon oil charge and hydrogen may be concurrent or countercurrent to the flow of contact material. A fluid type of operation wherein the treating agent containing molecular sieve contact material is carried in suspension in the hydrocarbon charge may also feasibly be employed. In carrying out the process in a continuous manner, a cyclic operation is employed wherein the lower boiling form of the treating agent resulting from refining the hydrocarbon charge and displaced from the treating agent containing molecular sieve material is adsorbed downstream in a second bed of molecular sieve material which may either be the same or a different type molecular sieve material than that initially utilized for loading with the treating agent. The second bed of molecular sieve material, maintained at a temperature between about 50 and about 300° F., and a pressure between about 50 and about 5000 p.s.i.g., originally contains no treating agent. However, as the operation proceeds, the treating agent content of the initial bed of the treating agent containing sieve material decreases and the lower boiling form of the treating agent content of the second bed of molecular sieve material, which serves as a collector thereof contained in the effluent, in the reactor stream, increases. As the treating agent content of the second bed goes up and that of the initial bed goes down, a predetermined optimum point is reached, at which point the second bed is regenerated and the flow of hydrocarbon charge, together with hydrogen and the conditions of temperature and pressure present in the initial bed and second bed are reversed. The operation is thereafter repeatedly carried out on a continuous cyclic basis with a resulting high yield of upgraded oil.

The non-volatile treating agent contained in the molecular sieve contact material is first converted during the reaction into a lower boiling compound which is then vaporized and displaced from the molecular sieve contact material and is collected downstream on the cold unloaded bed of contact material. During regeneration, the lower boiling compound of the treating agent which has been adsorbed in the downstream bed is converted back to the relatively non-volatile original treating agent after which the cycle is reversed.

In a dehydrogenation process, such as dehydrocyclization of paraffins to aromatics, certain of the non-volatile treating agents having a vapor pressure less than about 1 mm. at 1400° F. (760° C.) are converted to the lower boiling hydride which is boiled off or is displaced from the first bed. Iron does not form a lower boiling hydride.

Table II shows the boiling points of the various hydrides formed:

TABLE II

| Treating Agent | Hydride | |
|---|---|---|
| | Formula | B.P., °C. |
| Gallium | $Ga_2H_6$ | 139. |
| Boron (Amorphous) | $B_2H_6$ | −92.5. |
| Germanium | GeH | d. 165. |
| | $GeH_4$ | −90. |
| | $Ge_2H_6$ | 29. |
| | $Ge_3H_8$ | 110.5. |
| Tin | $SnH_4$ | −52. |
| Antimony | $SbH_3$ | −18. |
| Bismuth | $BiH_3$ | Unstable. |

When the reaction is a dehalogenation or dehydrohalogenation reaction, the non-volatile treating agent acts as an acceptor for the atom being removed. The resulting compound would be lower boiling.

Table III shows the boiling points of such compounds:

TABLE III

*Chlorides*

| Formula: | B.P., °C. |
|---|---|
| $BCl_3$ | 12.5 |
| $GaCl_3$ | 201 |
| $GeCl_4$ | 83 |
| $SnCl_2$ | 623 |
| $SnCl_4$ | 114 |
| $SbCl_3$ | 219 |
| $BiCl_3$ | 441 |
| $FeCl_3$ | 315 |

*Bromides*

| Formula: | B.P., °C. |
|---|---|
| $BBr_3$ | 90 |
| $GaBr_3$ | 279 |
| $GeBr_4$ | 186 |
| $SnBr_2$ | 620 |
| $SnBr_4$ | 202 |
| $SbBr_3$ | 280 |
| $BiBr_3$ | 461 |

The regeneration procedure used for converting the lower boiling compound back to the original non-volatile metal will vary with the atom reaching with the non-volatile treating agent. In general, oxidation and photochemical regeneration are preferred. In the case of oxidation of the lower boiling compound, a portion of the non-volatile treating agent could be converted to the oxide, but Table IV shows that the oxides are also non-volatile boiling above 760° C. (1400° F.). Thus, the non-volatile treating agent can be either the element itself or the oxide.

TABLE IV

*Oxides*

| Formula: | B.P., °C. |
|---|---|
| $B_2O_3$ | 1500 |
| $Ga_2O_3$ | 1900(M.P.) |
| $GeO_2$ | 1100(M.P.) |
| SnO | d.700–950 |
| $SnO_2$ | 1127(M.P.) d. |
| $Sb_2O_3$ | 1425 |
| $Bi_2O_3$ | 1900 |
| $Fe_2O_3$ | 1560 |

A system for carrying out the above-described continuous cyclic operation utilizing hydrogen as the gaseous medium is shown in the attached drawing. Referring more particularly to such figure, a charge of hydrocarbon oil to be upgraded is introduced through conduit 10. Hydrogen is introduced through conduits 11 and 12 and flows in admixture with the oil charge through a multi-bypass valve 13 controlled to direct the entire flow through conduit 14 to reaction chamber 15 having contained therein a crystalline molecular sieve material loaded with a suitable quantity of the non-volatile treating agent and maintained by means not shown at a temperature between about 400 and about 1400° F. and a pressure between about 50 and about 5000 p.s.i.g. The effluent from reactor 15 flows through conduit 16 to vessel 17 containing a crystalline molecular sieve material initially free of volatile treating agent and maintained, by means not shown, at a temperature between about 50° F. and about 300° F. and a pressure between about 50 and about 5000 p.s.i.g. The lower boiling compound of the treating agent contained in the effluent stream entering vessel 17 is adsorbed on the molecular sieve material contained therein. The remaining product stream flows from vessel 17 through conduit 18 and is conducted through line 19 to fractionator 20. Residual product is removed from the bottom of the fractionator through outlet 21. The upgraded oil product is removed through outlet 22. A hydrogen containing stream is removed overhead through outlet 23 and passes through adsorber 24 wherein ammonia and/or hydrogen sulfide are removed by absorption. Residual hydrogen passes from adsorber 24 through line 12 and is recycled to the operation.

When the amount of the treating agent contained in the molecular sieve material in vessel 15 and the amount of lower boiling compound of the treating agent contained in the molecular sieve material in vessel 17 respectively reach a predetermined minimum and maximum content, the regenerating gas is introduced through conduit 30 through a multi-bypass valve 31 controlled to direct the entire flow through conduit 32 to reaction chamber 17 and thence out of the reaction chamber 17 through conduit 33. When reaction chamber 15 is to be regenerated, the regeneration gas is directed through valve 31 and through conduit 34 to chamber 15 and thence out through conduit 35. After regeneration, bypass valve 13 is adjusted to direct the entire flow through conduit 25 to vessel 17. The effluent from 17 then flows through conduit 16 to vessel 15 and passes therefrom through conduit 26 and then through line 19 to fractionator 20 as described above. The above cyclic operation may be repeated any desired number of times, with control of valves 13 and 31 being placed, if desired, on an automatic basis. Such manner of operation provides an inexpensive and unusually efficient means for recovering the treating agent and affording a resultant high yield of upgraded oil product.

The following examples will serve to illustrate the process of the invention without limiting the same:

EXAMPLE 1

A 4.5 gram sample of commercial 13X molecular sieve was milled with 0.5 gram antimony metal. The catalyst was calcined in a helium atmosphere at 1000° F. for 15 minutes. It was then tested for conversion of normal hexane at 1000° F., 9 seconds contact time at atmospheric pressure. 25.6 weight percent $C_1$–$C_5$ were obtained.

EXAMPLE 2

A catalyst was made similarly to that of Example 1 except that bismuth was substituted for the antimony. Testing for conversion of normal hexane at 1000° F., 9 seconds contact time and atmospheric pressure yielded 12.9 weieght percent of $C_1$–$C_5$.

EXAMPLE 3

A catalyst was prepared and tested as in Example 2 except that $Bi_2O_3$ was the non-zeolitic component. A yield of 15.8 weight percent $C_1$–$C_5$ was obtained.

EXAMPLE 4

A catalyst was prepared and tested as in Example 1 using high purity gallium as the metal. A yield of 16.2 weight percent $C_1$–$C_5$ was obtained.

EXAMPLE 5

A 35 ml. sample of 13X aluminosilicate was treated at 395–480° F. with 21.6 ml. of 25% $Fe(CO)_5$ in light distillate fuel over a period of 90 minutes. The catalyst was then purged with helium for 1 hour at 480–645° F. to decompose the carbonyl and deposit metallic iron on the catalyst. The catalyst was calcined in helium for 30 minutes and then tested for n-hexane conversion as above. 45.6 weight percent $C_1$–$C_5$ and 5.1 weight percent benzene were obtained.

EXAMPLE 6

The catalyst from Example 4 was regenerated at 1000° F. in air for 30 minutes. It was cooled in helium to 500° F. A 1:1 mixture of 1-butene and hydrogen chloride was then passed through the catalyst bed at 10 ml./minute for 90 minutes. The effluent was condensed and analyzed by vapor phase chromatography. The run was continued for an additional 90 minutes at 400° F. Production distribution was as follows:

| Temp., ° F. | Chlorobutanes | Issooctene | Butenes |
| --- | --- | --- | --- |
| 500 | 49.0 | 20.5 | 30.5 |
| 400 | 77.2 | 2.9 | 19.9 |

EXAMPLE 7

A 1.5 ml. aliquot of the catalyst from Example 4 was subjected to a stream of 1:1 ammonia:ethylene oxide at 400° F. and 10 ml./minute. Chromatographic analysis of the products (water free) is as follows:

Butenes, wt. percent _____ 69.6
Ethanolamines, wt. percent _____ 30.4

Although the present invention has been described in conjunction with preferred embodiments, it is to be understood that modifications and variations may be resorted to, without departing from the spirit and scope thereof, as those skilled in the art will readily understand. Such variations and modifications are considered to be within the purview and scope of the appended claims.

What is claimed is:

1. A continuous cyclic process for upgrading a hydrocarbon oil which comprises contacting the same in a primary contact zone containing a crystalline molecular sieve material having a non-volatile treating agent characterized by a vapor pressure less than about 1 mm. at 1400° F. and capable of being chemically converted to a lower boiling compound encased within its crystal structure under conditions such that said treating agent acts to upgrade said hydrocarbon oil, said treating agent being converted to a lower boiling compound which is released from said molecular sieve material, passing the effluent stream containing said released lower boiling compound of the treating agent from said primary contact zone to a secondary contact zone containing a crystalline molecular sieve material initially free of said treating agent and maintained under conditions capable of adsorbing said lower boiling compound of the treating agent, whereby the lower boiling compound of the treating agent contained in the effluent stream from said primary zone is adsorbed on the molecular sieve material in said secondary contact zone upon passage therethrough, maintaining the aforesaid contacting conditions until the treating agent contained in the molecular sieve materials of said primary and secondary contact zones respectively reach a predetermined minimum and maximum content, thereafter regenerating the molecular sieve material in said secondary contact zone to convert said lower boiling compound of the treating agent to a nonvolatile treating agent, thereafter reversing the flow of the hydrocarbon oil charge and the conditions initially present in said primary zone and said secondary zone and repeating the aforesaid cyclic operation to afford a continuous yield of upgraded hydrocarbon oil product.

2. A continuous cyclic process in accordance with claim 1 wherein the temperature in the primary contact zone is between about 400 and about 1400° F.

3. A continuous cyclic process in accordance with claim 1 wherein the non-volatile treating agent is selected from the group consisting of gallium, boron, germanium, tin, antimony, iron, bismuth and their oxides.

4. A continuous cyclic process in accordance with claim 1 wherein the molecular sieve material has uniform pore openings of between about 4 and 15 Angstroms in diameter.

5. A continuous cyclic process in accordance with claim 2 wherein the amount of non-volatile treating agent encased in the molecular sieve material is between about 1 and about 60 weight percent.

6. A continuous cyclic process in accordance with claim 1 wherein the upgrading reaction is a hydrogenation reaction.

7. A continuous cyclic process in accordance with claim 1 wherein the upgrading reaction is a dehydrogenation reaction.

8. A continuous cyclic process in accordance with claim 1 where the non-volatile treating agent is gallium.

9. A continuous cyclic process in accordance with claim 1 where the non-volatile treating agent is boron.

10. A continuous cyclic process in accordance with claim 1 where the non-volatile treating agent is germanium.

11. A continuous cyclic process in accordance with claim 1 where the non-volatile treating agent is tin.

12. A continuous cyclic process in accordance with claim 1 wherein the non-volatile treating agent is antimony.

13. A continuous cyclic process in accordance with claim 1 wherein the non-volatile treating agent is iron.

14. A continuous cyclic process in accordance with claim 1 wherein the non-volatile treating agent is bismuth.

15. A continuous cyclic process in accordance with claim 1 wherein the regeneration is an oxidation reaction.

16. A continuous cyclic process in accordance with claim 1 wherein the regeneration is a photo chemical reaction.

17. A continuous cyclic process for upgrading a hydrocarbon oil which comprises contacting the same with hydrogen at a temperature between about 400 and about 1000° F. in a primary contact zone containing a crystalline molecular sieve material having a non-volatile treating agent characterized by a vapor pressure less than about 1 mm. at 1400° F. and capable of being chemically converted to a lower boiling compound encased within its crystal structure, said treating agent acting to upgrade said hydrocarbon oil and being converted to a lower boiling compound of said treating agent which is released from said molecular sieve material, passing the effluent stream from said primary contact zone to a secondary contact zone containing a crystalline molecular sieve material initially free of said treating agent and maintained under conditions capable of adsorbing said lower boiling compound of the treating agent, whereby the lower boiling compound of the treating agent contained in the effluent stream from said primary zone is adsorbed on the molecular sieve material in said secondary contact zone upon passage therethrough, maintaining the aforesaid contacting conditions until the treating agent contained in the molecular sieve materials of said primary and secondary contact zones respectively reach a predetermined minimum and maximum content, thereafter regenerating the molecular sieve material in said secondary contact zone to convert said lower boiling compound of the treating agent to a non-volatile treating agent, thereafter reversing the flow of the hydrocarbon oil charge and hydrogen and the temperature conditions initially present in said primary zone and said secondary zone and repeating the aforesaid cyclic operation to afford a continuous yield of upgraded hydrocarbon oil product.

18. A continuous cyclic process for removing nitrogen, sulfur and oxygen from a hydrocarbon oil containing the same which comprises contacting said oil with hydrogen at a temperature between about 400 and 1000° F. in a primary contact zone containing a crystalline molecular sieve material having uniform pore openings of between about 4 and about 15 Angstroms in diameter and having encased within its crystalline structure between about 1 and about 60 weight percent of a non-volatile treating agent selected from the group consisting of gallium, boron, germanium, tin, antimony, bismuth and their oxides, said non-volatile treating agents being converted to a lower boiling compound of said treating agents which is released from said molecular sieve material, passing the effluent stream from said primary contact zone to a secondary contact zone containing a crystalline molecular sieve material having uniform pore openings of between about 4 and about 15 Angstroms in diameter initially free of treating agent and maintained under conditions capable of adsorbing said lower boiling compound, whereby the lower boiling compound of the treating agent in said effluent stream from said primary zone is adsorbed on the molecular sieve material in said secondary contact zone upon passage therethrough, maintaining the aforesaid contacting conditions until the treating agent contained in the molecular sieve materials of said primary contact zone and its lower boiling product in said secondary contact zone respectively reach a predetermined minimum and maximum content, thereafter regenerating the molecular sieve material in said secondary contact zone to convert the lower boiling compound of the treating agent to a non-volatile treating agent, thereafter reversing the flow of the hydrocarbon oil charge and hydrogen and the conditions of temperature initially present in said primary zone and said secondary zone and repeating the aforesaid cyclic operation to afford a continuous yield of upgraded hydrocarbon oil product.

19. A continuous cyclic process for upgrading a hydrocarbon oil which comprises contacting the same with between about 2 and about 80 mols of hydrogen per mol of hydrocarbon at a temperature between about 400 and about 1000° F., a pressure between about 50 and about 5000 p.s.i.g., and a liquid hourly space velocity between about 1.0 and about 10 in a primary contact zone containing a crystalline molecular sieve material having encased within its crystal structure between about 1 and about 60 weight percent of a non-volatile treating agent selected from the group consisting of gallium, boron, germanium, tin, antimony, bismuth and their oxides, said treating agent being converted to a lower boiling hydride of said treating agents which is released from said molecular sieve material, passing the effluent stream from said primary contact zone to a secondary contact zone containing a crystalline molecular sieve material initially free of treating agent and maintained under conditions capable of adsorbing said lower boiling hydride, whereby the hydride containing effluent in the stream from said primary zone is adsorbed on the molecular sieve material in said secondary contact zone upon passage therethrough, maintaining the aforesaid contacting conditions until the treating agent contained in the molecular sieve materials of said primary and secondary contact zones respectively reach a predetermined minimum and maximum content, thereafter regenerating the molecular sieve material in said second contact zone to convert the hydride to a non-volatile treating agent, reversing the flow of the hydrocarbon oil charge and hydrogen and the conditions of temperature and pressure initially present in said primary zone and said secondary zone and repeating the aforesaid cyclic operation to afford a continuous yield of upgraded hydrocarbon oil product.

20. The process of claim 19 wherein the molecular sieve material is a crystalline aluminosilicate characterized by an effective uniform pore diameter of between about 4 and about 15 Angstrom units.

21. The process of claim 19 wherein the molecular sieve material contained in the primary and secondary contact zones is characterized by substantially the same effective uniform pore diameter.

22. The process of claim 19 wherein the regeneration is an oxidation reaction to convert the hydride back to the original element and its oxide.

23. The process of claim 1 wherein the molecular sieve material is characterized by an effective uniform pore diameter of between about 4 and about 15 Angstrom units and is a crystalline aluminosilicate of a metal selected from the group consisting of alkali metals and alkaline earth metals.

References Cited by the Examiner

UNITED STATES PATENTS

| | | | |
|---|---|---|---|
| 2,313,661 | 3/1943 | Montgomery | 260—683.74 |
| 2,668,142 | 2/1954 | Strecker et al. | 208—135 |
| 2,783,185 | 2/1957 | Hughes et al. | 208—134 |
| 2,786,086 | 3/1957 | Gitterman | 208—135 |
| 2,971,904 | 2/1961 | Gladrow et al. | 208—135 |
| 3,140,253 | 7/1964 | Plank et al. | 208—120 |

DELBERT E. GANTZ, *Primary Examiner.*

ABRAHAM RIMENS, *Examiner.*